(12) United States Patent
Cheng et al.

(10) Patent No.: US 11,862,116 B2
(45) Date of Patent: Jan. 2, 2024

(54) HANDWRITING READING DEVICE, METHOD FOR PROCESSING REPORT POINT DATA, AND COMPUTER STORAGE MEDIUM

(71) Applicants: ZHANGYUE TECHNOLOGY CO., LTD, Beijing (CN); SHENZHEN ZHANGYUE TECHNOLOGY CO., LTD, Shenzhen (CN)

(72) Inventors: Chao Cheng, Beijing (CN); Bin Liu, Beijing (CN); Hongtao Tao, Beijing (CN)

(73) Assignees: ZHANGYUE TECHNOLOGY CO., LTD, Beijing (CN); SHENZHEN ZHANGYUE TECHNOLOGY CO., LTD, Shenzhen (CN)

( * ) Notice: Subject to any disclaimer, the term of this patent is extended or adjusted under 35 U.S.C. 154(b) by 87 days.

(21) Appl. No.: 17/762,365

(22) PCT Filed: Nov. 21, 2019

(86) PCT No.: PCT/CN2019/120012
§ 371 (c)(1),
(2) Date: Mar. 21, 2022

(87) PCT Pub. No.: WO2021/056786
PCT Pub. Date: Apr. 1, 2021

(65) Prior Publication Data
US 2022/0392412 A1 Dec. 8, 2022

(30) Foreign Application Priority Data

Sep. 25, 2019 (CN) .......................... 201910913499.8
Sep. 25, 2019 (CN) .......................... 201921614727.3

(51) Int. Cl.
*G09G 3/34* (2006.01)
*G06F 3/0354* (2013.01)
(Continued)

(52) U.S. Cl.
CPC ......... *G09G 3/344* (2013.01); *G06F 3/03545* (2013.01); *G06F 3/046* (2013.01);
(Continued)

(58) Field of Classification Search
CPC .. G06F 3/04166; G06F 3/046; G06F 3/03545; G06F 3/0416; G09G 3/344;
(Continued)

(56) References Cited

U.S. PATENT DOCUMENTS 11,373,606 B2* 6/2022 Cheng ..................... G02F 1/167
11,494,071 B2* 11/2022 Tao .......................... G06F 3/14
(Continued)

FOREIGN PATENT DOCUMENTS

CN 101872586 A 10/2010
CN 202075965 U 12/2011
(Continued)

OTHER PUBLICATIONS

International Patent Application No. PCT/CN2019/120012; Int'l Search Report; dated Jun. 22, 2020; 2 pages.

*Primary Examiner* — Doon Y Chow
(74) *Attorney, Agent, or Firm* — BakerHostetler

(57) ABSTRACT

The present disclosure discloses a method for processing a report point data, a handwriting reading device and a computer storage medium. The method for processing the report point data includes: transmitting report point data associated with received handwriting to a display controller by a System on Chip; looking up a LUT table and acquiring a first waveform of driving an ink screen based on the report point data by the display controller; and driving the ink screen to display the handwriting using the first waveform by the display controller.

13 Claims, 9 Drawing Sheets

(51) Int. Cl.
*G06F 3/041* (2006.01)
*G06F 3/046* (2006.01)

(52) U.S. Cl.
CPC ....... *G06F 3/0416* (2013.01); *G09G 2310/06* (2013.01); *G09G 2354/00* (2013.01); *G09G 2370/00* (2013.01)

(58) Field of Classification Search
CPC ........... G09G 2310/06; G09G 2354/00; G09G 2370/00; G06V 30/32
See application file for complete search history.

(56) References Cited

U.S. PATENT DOCUMENTS

| | | | |
|---|---|---|---|
| 11,693,380 B1* | 7/2023 | Shao | G05B 19/042 700/282 |
| 2011/0261031 A1 | 10/2011 | Muto | |
| 2012/0194532 A1* | 8/2012 | Shih | G09G 5/399 345/545 |
| 2012/0229485 A1* | 9/2012 | Rhodes | G09G 5/246 345/545 |
| 2013/0201112 A1* | 8/2013 | Large | G06F 3/04883 345/173 |
| 2014/0075302 A1* | 3/2014 | Akashi | G06V 30/32 715/268 |
| 2014/0363083 A1* | 12/2014 | Xia | G06F 40/166 382/189 |
| 2018/0181221 A1* | 6/2018 | Nakajima | G06F 3/04883 |
| 2018/0254768 A1* | 9/2018 | Shan | G06F 3/0416 |

FOREIGN PATENT DOCUMENTS

| | | |
|---|---|---|
| CN | 102651199 A | 8/2012 |
| CN | 104020969 A | 9/2014 |
| CN | 104067208 A | 9/2014 |
| CN | 105023542 A | 11/2015 |
| CN | 108615506 A | 10/2018 |
| CN | 108762597 A | 11/2018 |
| CN | 108959201 A | 12/2018 |
| CN | 209265993 U | 8/2019 |
| JP | 2014-191383 A | 10/2014 |

* cited by examiner

HANDWRITING READING DEVICE, METHOD FOR PROCESSING REPORT POINT DATA, AND COMPUTER STORAGE MEDIUM

CROSS-REFERENCE TO RELATED APPLICATIONS

The present disclosure is the U.S. National Stage of International Application No. PCT/CN2019/120012, filed on Nov. 21, 2019, which claims the priorities of the Chinese patent publications with the publication number of 201910913499.8 and the title of "Handwriting Reading Device, Method for Processing Report Point Data and Computer Storage Medium" filed with the China Patent Office on Sep. 25, 2019 and with the publication number of 201921614727.3 and the title of "Handwriting Reading Device" filed with the China Patent Office on Sep. 25, 2019, the entire contents of which are incorporated herein by reference.

TECHNICAL FIELD

The present disclosure relates to the field of computer technology, and in particular to a handwriting reading device, a method for processing report point data and a computer storage medium.

BACKGROUND

A handwriting reading device (such as an electronic book reader) generally uses an ink screen (Electronic-ink or Electronic Paper Display/EPD) to display contents and provide an electromagnetic handwriting function at the same time. Ink screen is also referred to as an Electronic Paper Display (EPD).

The handwriting function of the handwriting reading device is implemented by the following way: a layer of electromagnetic film with the same or approximately the same size as the screen is arranged under the EPD for induction of movement of the handwriting stylus, contents are written on the screen with an electromagnetic handwriting stylus outside the device, coordinate data of handwriting is obtained by induction of the electromagnetic film and reported to a master chip such as a System on Chip (SOC), and a handwriting image is output by the SOC to a display controller to drive the EPD for displaying.

The handwriting process of the handwriting reading device is a dynamic process. For example, using a handwriting stylus to draw a line is a process of drawing from a starting point to an ending point. In order to ensure a real experience of handwriting, in the process of writing, the handwriting reading device needs to continuously draw and display handwriting image frame by frame, and the handwriting function has very high requirement on real-time displaying of handwriting, and pursues a displaying effect of "following the pen". The traditional handwriting reading device has not yet realized direct transmission of report point data between a handwriting board and the display controller. Therefore, how to shorten time duration between the time when the tip is triggered and the time when corresponding handwriting contents are displayed as much as possible is an urgent problem to be solved at present.

SUMMARY

In view of the above problem, the present application is proposed in order to provide an electronic paper displaying device that overcomes the above problem or at least partially solves the above problem.

According to one aspect of the present disclosure, a method for processing a report point data is provided, which includes:
transmitting report point data associated with received handwriting to a display controller by a System on Chip;
looking up a LUT table and acquiring a first waveform of driving an ink screen based on the report point data by the display controller; and
driving the ink screen to display the handwriting using the first waveform by the display controller.

According to yet another aspect of the present disclosure, a handwriting reading device is provided, which includes an electromagnetic board, a System on Chip SOC, a display controller and an ink screen that are electrically connected in sequence, wherein the electromagnetic board is configured to detect a handwritten operation instruction generated by an electromagnetic stylus on the ink screen, the SOC and the display controller are configured to respectively store at least one executable instruction that upon execution cause the processor to perform operations, the operations comprising:
transmitting report point data associated with received handwriting to a display controller by a System on Chip;
looking up a LUT table and acquiring a first waveform of driving an ink screen based on the report point data by the display controller; and
driving the ink screen to display the handwriting using the first waveform by the display controller.

According to yet another aspect of the present disclosure, a non-volatile computer-readable storage medium is provided, in which at least one executable instruction is stored, the executable instruction causing a System on Chip and a display controller to perform the following operations:
transmitting report point data associated with received handwriting to a display controller by a System on Chip;
looking up a LUT table and acquiring a first waveform of driving an ink screen based on the report point data by the display controller; and
driving the ink screen to display the handwriting using the first waveform by the display controller.

According to yet another aspect of the present disclosure, a computer program product is provided, which includes a computer program stored on the above non-volatile computer-readable storage medium.

In the method for processing a report point data, the handwriting reading device and the computer storage medium provided by the present disclosure, the report point data is directly transmitted by the System on Chip to the display controller at the hardware layer, the process of the report point data from the core layer of the System on Chip to its application layer and then back to the core layer from the application layer is cancelled, which saves transmission time for the report point data, shortens time-consuming of drawing the handwriting, and improve speed of drawing the handwriting.

According to yet another aspect of the present disclosure, a handwriting reading device for processing a report point data by using a method for processing a report point data disclosed by the present application, including a handwriting board, a System on Chip, a display controller and an ink screen, wherein the handwriting board is configured to detect report point data, the System on Chip and the display controller are electrically connected, and the display controller and the ink screen are electrically connected, and the device further includes a switching component, which is electrically connected to the handwriting board, the System on Chip, and the display controller, respectively, and is configured to switch between a connection of the handwriting board and the System on Chip and another connection of the handwriting board and the display controller.

In the handwriting reading device provided by the present disclosure, by providing the switching component to switch between a connection of the handwriting board and the System on Chip and another connection of the handwriting board and the display controller, when the connection of the handwriting board and the display controller are switched on, direct transmission of switching component between the handwriting board and the display controller is realized, and the display controller receives the report point data detected by the handwriting board and drives the ink screen to display. Compared to the way of the report point data from the core layer of the System on Chip to its application layer and then back to the core layer from the application layer in the prior art, the present disclosure saves transmission time for the report point data, shortens time-consuming of drawing the handwriting, and improve speed of drawing the handwriting.

The above explanation is only an overview of the technical solutions of the present disclosure. In order to enable a clearer understanding of the technical means of the present disclosure so as to be able to be implemented in accordance with the contents of the description, and in order to enable the above and other purposes, features and advantages of the present disclosure more obvious and easier to understand, the specific embodiments of the present disclosure will be specifically given below.

BRIEF DESCRIPTION OF THE DRAWINGS

Various other advantages and benefits will become apparent to those ordinarily skilled in the art upon reading the following detailed description of the preferred embodiments. The drawings are for purposes of illustrating preferred embodiments only and are not to be considered as limiting of the present disclosure. Also, the same components are denoted by the same reference numerals throughout the drawings. In the drawings.

DETAILED DESCRIPTION

Figure 1:
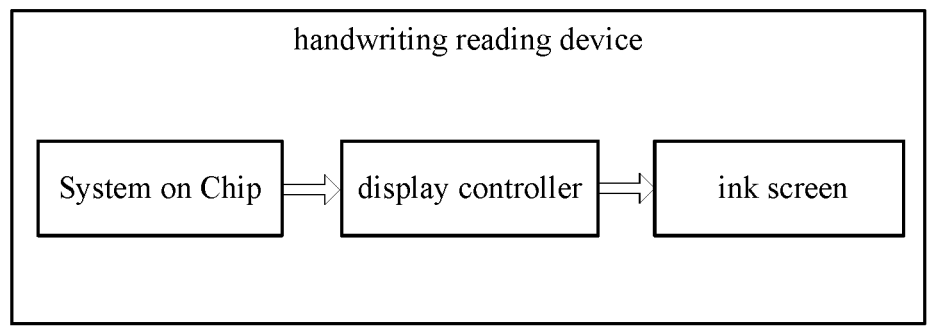
FIG. 1 shows a hardware structure diagram of an existing handwriting reading device.

Exemplary embodiments of the present disclosure will be described in more detail below with reference to the accompanying drawings. While exemplary embodiments of the present disclosure are shown in the drawings, it should be understood that the present disclosure can be embodied in various forms and should not be limited by the embodiments set forth herein. Rather, these embodiments are provided so that the present disclosure can be more thoroughly understood, and the scope of the present disclosure can be fully conveyed to those skilled in the art.

The handwriting reading device includes an electromagnetic board, a System on Chip, a display controller and an ink screen, that are electrically connected in sequence. The electromagnetic board is provided with an electromagnetic film, and a handwriting operation instruction generated by an electromagnetic stylus on the ink screen is detected by the electromagnetic film.

Figure 2:
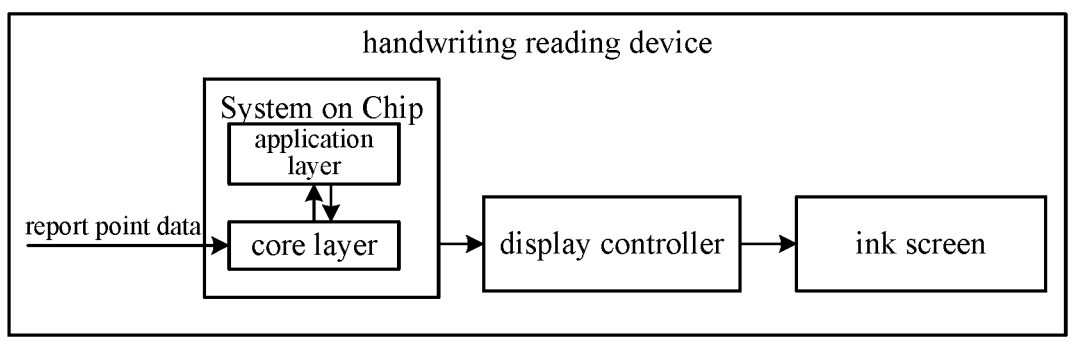
FIG. 2 shows a transmission process schematic diagram of report point data in the existing handwriting reading device.

In the prior art, after the electromagnetic film of the handwriting reading device detects an electromagnetic signal triggered by a handwriting stylus, the electromagnetic signal is converted into report point data, and then transmitted to the core layer (also referred to as Kernel) of the SOC. The Kernel transmits the report point data to the upper application layer, and the application layer generates a handwriting trajectory image to be displayed based on the report point data, and converts the handwriting trajectory image into a grayscale image, and then the application layer transmits the grayscale image back to the Kernel. The SOC transmits the grayscale image to the display controller such as an Electronic Paper Display Controller (EPDC) or a Timer Control Register (TCON). The EPDC or TCON obtains waveform for driving respective pixel points based on a grayscale image Look-Up-Table (LUT) of each pixel point in the grayscale image, and the EPDC or TCON drives the EPD for displaying by using the waveform. It can be seen that in this process, the report point data goes through a process from the Kernel of the SOC to its application layer, to the Kernel of the SOC, and then to the EPDC or TCON, which increases time-consuming of handwriting displaying process. The hardware structure of the existing handwriting reading device is shown in FIG. 1, and transmission process of the report point data is shown in FIG. 2.

Figure 3:
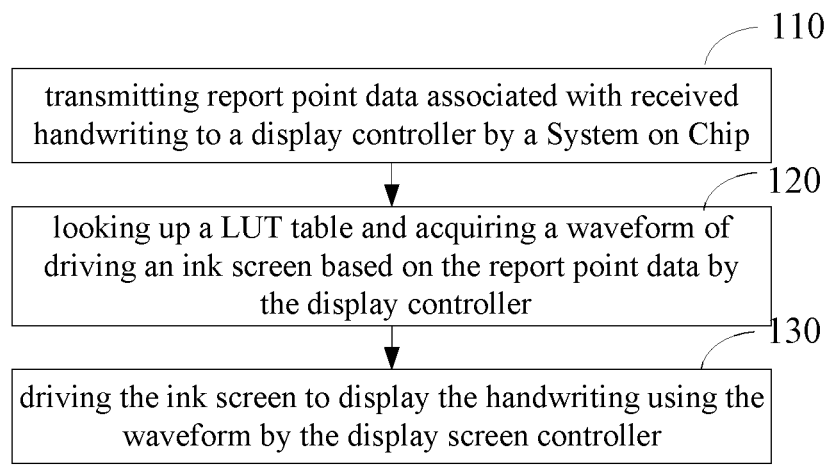
FIG. 3 shows a schematic flowchart of a method for processing a report point data provided by an embodiment of the present disclosure.

FIG. 3 shows a schematic flowchart of a method for processing a report point data provided by an embodiment of the present disclosure, which is applied in the handwriting reading device. As shown in FIG. 3, the method includes the following steps.

a step 110: transmitting report point data associated with received handwriting to a display controller by a System on Chip.

After the electromagnetic film of the handwriting reading device detects the electromagnetic signal triggered by the handwriting stylus, the electromagnetic signal is converted into the report point data, and then transmitted to the System on Chip. The System on Chip directly transmits the report point data associated with handwriting to the display controller at the hardware layer. Specifically, the core layer of the System on Chip directly transmits the report point data to the display controller. Therefore, the process of the report point data from the core layer of the System on Chip to its application layer and then back to the core layer from the application layer is cancelled, which saves transmission time for the report point data, shortens time-consuming of drawing the handwriting, and improves speed of drawing the handwriting.

The report point data of the handwriting, in addition to coordinate data of the handwriting, generally also includes pressure-sensitive data. In the prior art, the application layer of the System on Chip realizes different stroke effects based on the pressure-sensitive data when generating a handwriting image, and at the same time, the application layer also synthesizes the image based on attribute information such as handwriting color, line thickness and the like preselected by a user. But the core layer of the System on Chip does not have synthesis ability of handwriting effects of the application layer. Therefore, after the report point data is directly transmitted by the core layer to the display controller, the displaying screen only can be driven to display a black line, and stroke, thickness and other effects of the line will not be displayed.

Since in the solution in which the core layer of the System on Chip directly transmits the report point data to the display controller, the pressure-sensitive data does not need to be used, in some embodiments of the present disclosure, the System on Chip can remove the pressure-sensitive data from the report point data associated with the handwriting to remain only coordinate data in the report point data, and only the coordinate data in the report point data is transmitted to the display controller. In this way, the amount of data transmission can be reduced, transmission time of the report point data can be further saved, and speed of drawing the handwriting can be improved.

a step 120: looking up a LUT table and acquiring a waveform of driving an ink screen based on the report point data by the display controller.

Figure 4:
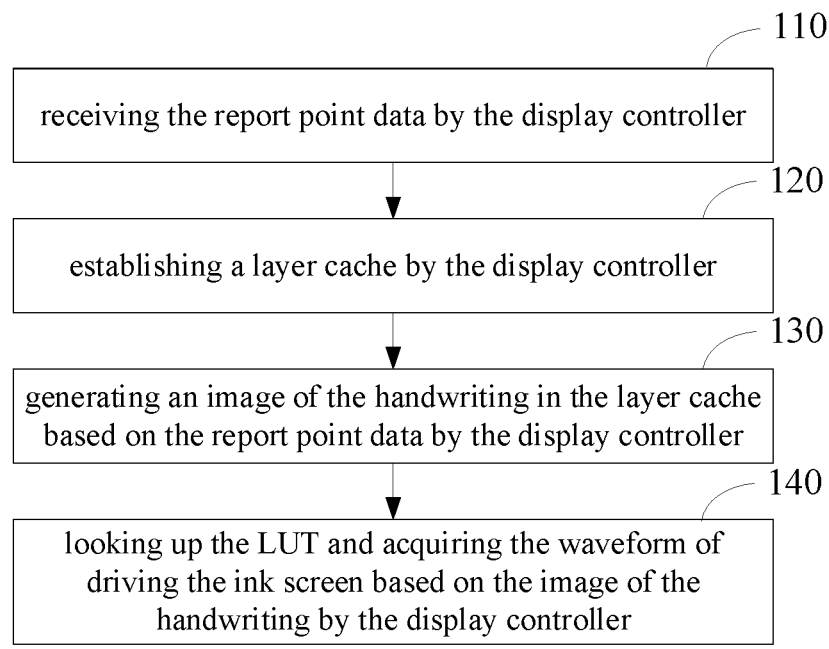
FIG. 4 shows a schematic flowchart of step 120 in FIG. 3

After the display controller receives the report point data, a Look-Up-Table (LUT) needs to be looked up based on the report point data to acquire the waveform of driving the ink screen. Specifically, as shown in FIG. 4, the step 120 can be implemented in the following way:

a step 121: receiving the report point data by the display controller;

a step 122: establishing a layer cache by the display controller;

a step 123: generating a image of the handwriting in the layer cache based on the report point data by the display controller;

a step 124: looking up the LUT and acquiring the waveform of driving the ink screen based on the image of the handwriting by the display controller.

Because the display controller does not have synthesis ability of handwriting effects of the application layer, after the report point data is directly transmitted from the core layer to the display controller, the image generated by the display controller in the step 123 does not include effects such as color, thickness and stroke and the like of the handwriting, and the display controller can only drive the displaying screen to display black lines, and will not display stroke, thickness and other effects of the lines.

a step 130: driving the ink screen to display the handwriting using the waveform by the display screen controller.

In the embodiment of the present disclosure, the report point data is directly transmitted from the System on Chip to the display controller at the hardware layer, the process of the report point data from the core layer of the System on Chip to its application layer and then back to the core layer from the application layer is cancelled, which saves transmission time for the report point data, shortens time-consuming of drawing the handwriting, and improve speed of drawing the handwriting.

When it is desired to be able to take into account response speed of the handwriting and displaying effect at the same time, another embodiment of the present disclosure provides an implementation method that takes into account both the speed and the effect. In this method, the report point data from the electromagnetic film is divided into two paths for transmissions. In one path the report point data is transmitted from the System on Chip directly to the display controller for displaying first, and in the other path it is transmitted by the core layer of the System on Chip to its application layer thereof at the same time or later. The application layer performs image synthesis (with color, thickness, stroke and other effects of the handwriting line added) to form a grayscale image, and then returns the grayscale image to the core layer. The core layer sends the grayscale image to the display controller.

Figure 5:
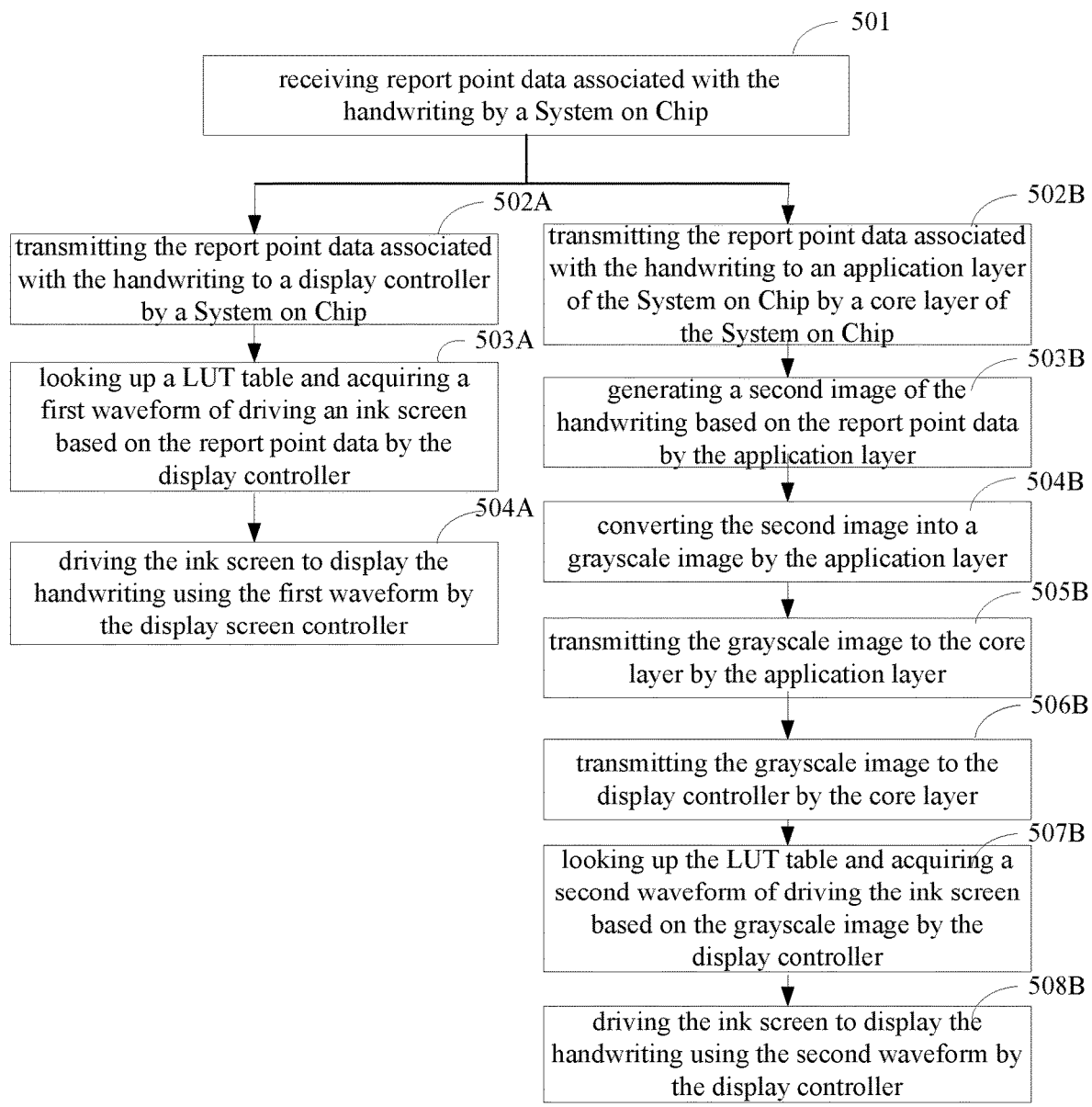
FIG. 5 shows a schematic flowchart of a method for processing a report point data provided by another embodiment of the present disclosure.

FIG. 5 shows a schematic flowchart of a method for processing a report point data provided by another embodiment of the present disclosure, which is applied in the handwriting reading device. As shown in FIG. 5, the method includes the following steps.

a step 501: receiving report point data associated with the handwriting by a System on Chip.

After the electromagnetic film of the handwriting reading device detects the electromagnetic signal triggered by the handwriting stylus, the electromagnetic signal is converted into the report point data, and then transmitted to the System on Chip.

a step 502A: transmitting the report point data associated with the handwriting to a display controller by a System on Chip.

The System on Chip directly transmits the report point data associated with handwriting to the display controller at the hardware layer. Specifically, the core layer of the System on Chip directly transmits the report point data to the display controller. Therefore, the process of the report point data from the core layer of the System on Chip to its application layer and then back to the core layer from the application layer is cancelled, which saves transmission time for the report point data, shortens time-consuming of drawing the handwriting, and improve speed of drawing the handwriting.

The report point data of the handwriting, in addition to coordinate data of the handwriting, generally also includes pressure-sensitive data. In the prior art, the application layer of the System on Chip realizes different stroke effects based on the pressure-sensitive data when generating a handwriting image, and at the same time, the application layer also synthesizes the image based on attribute information such as handwriting color, line thickness and the like preselected by a user. But the core layer of the System on Chip does not have synthesis ability of handwriting effects of the application layer. Therefore, after the report point data is directly transmitted by the core layer to the display controller, the displaying screen only can be driven to display a black line, and stroke, thickness and other effects of the line will not be displayed.

Since in the solution in which the core layer of the System on Chip directly transmits the report point data to the display controller, the pressure-sensitive data does not need to be used, in some embodiments of the present disclosure, the System on Chip can remove the pressure-sensitive data from the report point data associated with the handwriting to remain only coordinate data in the report point data, and only the coordinate data in the report point data is transmitted to the display controller. In this way, the amount of data transmission can be reduced, transmission time of the report point data can be further saved, and speed of drawing handwriting can be improved.

a step 503A: looking up a LUT table and acquiring a first waveform of driving an ink screen based on the report point data by the display controller.

Figure 6:
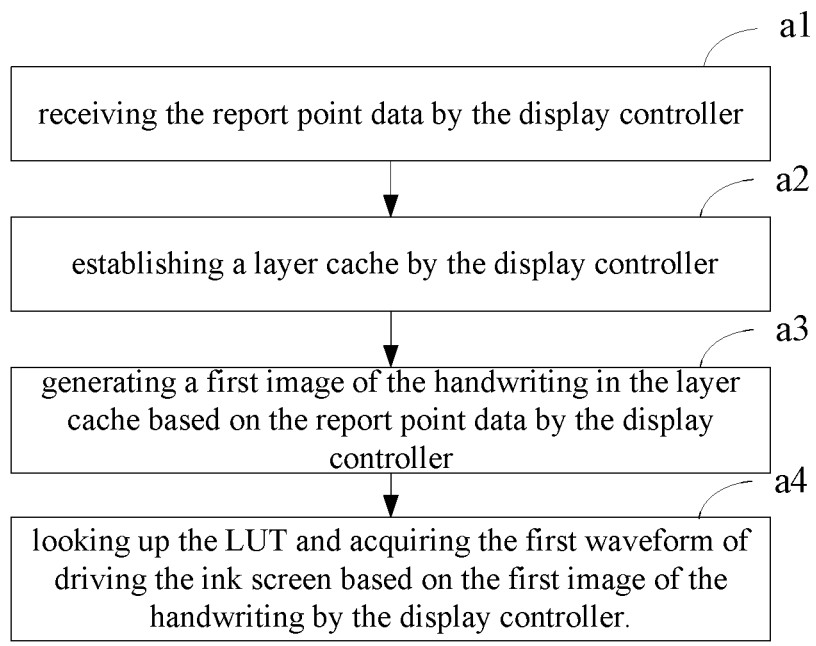
FIG. 6 shows a schematic flowchart of step 503A in FIG. 5.

After the display controller receives the report point data, a Look-Up-Table needs to be looked up based on the report point data to acquire the first waveform of driving the ink screen. Specifically, as shown in FIG. 6, the step 503A can be implemented in the following way:

a step a1: receiving the report point data by the display controller;

a step a2: establishing a layer cache by the display controller;

a step a3: generating a first image of the handwriting in the layer cache based on the report point data by the display controller;

a step a4: looking up the LUT and acquiring the first waveform of driving the ink screen based on the first image of the handwriting by the display controller.

Because the display controller does not have synthesis ability of handwriting effects of the application layer, after the report point data is directly transmitted by the core layer to the display controller, the image generated by the display controller in the step 503A does not include effects such color, thickness and stroke and the like of the handwriting, and the display controller can only drive the displaying screen to display black lines, and will not display stroke, thickness and other effects of the lines.

a step 504A: driving the ink screen to display the handwriting using the first waveform by the display screen controller.

a step 502B: transmitting the report point data associated with the handwriting to an application layer of the System on Chip by a core layer of the System on Chip.

It should be noted that the step 502B is performed at the same time as or after the step 502A.

a step 503B: generating a second image of the handwriting based on the report point data by the application layer.

The second image includes one or more of color, thickness and stroke of the handwriting.

a step 504B: converting the second image into a grayscale image by the application layer.

a step 505B: transmitting the grayscale image to the core layer by the application layer.

a step 506B: transmitting the grayscale image to the display controller by the core layer.

Figure 7:
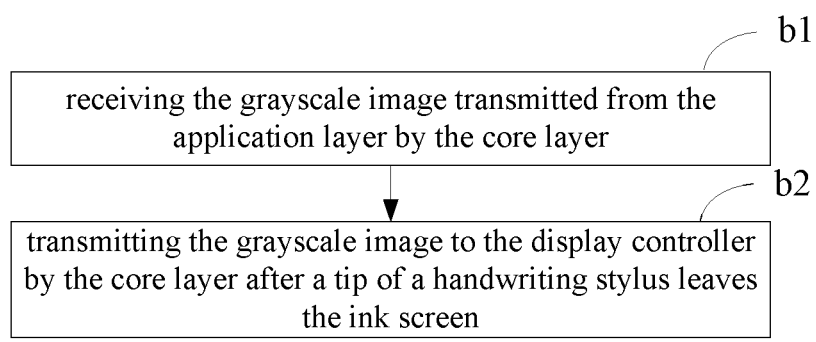
FIG. 7 shows a schematic flowchart of step 506B in FIG. 5.

In an implementation manner, it is possible to refresh the image of a second frame when the user finishes writing a stroke of a handwriting line and lifts the pen, and the visual effect presented at this time is: first, a black line with no effect is displayed along with the handwriting, and then the stylus is lifted, and the screen is refreshed, which turns the original black line with no effect into a line with effect. Since the coordinate data used to draw the handwriting in succession is the same, it appears that the latter line "replaces" the former line in the visual effect, but the latter line is actually a redrawn line. Specifically, as shown in FIG. 7, the step 506B further includes the following steps:

a step b1: receiving the grayscale image transmitted from the application layer by the core layer;

a step b2: transmitting the grayscale image to the display controller by the core layer after a tip of a handwriting stylus leaves the ink screen.

Wherein the tip of the handwriting stylus leaving the ink screen is determined by: the tip of the handwriting stylus leaving the ink screen is determined if receiving the report point data is stopped. When the user lifts the stylus, the electromagnetic film cannot detect the new report point data. At this time, the core layer of the System on Chip will stop receiving the report point data. Therefore, by determining whether receiving the report point data is stopped, it is determined whether the tip of the handwriting stylus leaves the ink screen.

Through the above method, the System on Chip transmits the report point data in a two-path way. When the core layer receives the grayscale image returned by the application layer, the grayscale image is not transmitted to the display controller first, but after the core layer receives a "stylus lifted" signal reported by the electromagnetic film, then it is transmitted to the display controller, so that it is realized that a line of the first path is drawn first, and then a line of the second path and with effect is drawn.

a step 507B: looking up the LUT table and acquiring a second waveform of driving the ink screen based on the grayscale image by the display controller.

a step 508B: driving the ink screen to display the handwriting using the second waveform by the display controller.

In the above steps, in the steps 502A-504A, the report point data is directly transmitted at the hardware layer from the System on Chip to the display controller, and the process of displaying of the ink screen is driven by the display controller; in steps 502B-508B, at the same time as or later after the report point data is transmitted at the hardware layer from the System on Chip to the display controller, it is transmitted from the core layer of the System on Chip to its application layer, and after image synthesis is performed by the application layer, then the grayscale image is transmitted to the display controller through the core layer, and the process of displaying of the ink screen is driven by the display controller. Before completion of the processing by the display controller, after the report point data is transmitted at the hardware layer by the System on Chip, the grayscale image synthesized by the application layer is processed, and the displaying effect observed by the user is: a black line with effect of no thickness and no stroke is displayed in the screen first, and then the screen performs refreshing once to refresh the original black line into a line with various effects, so as to achieve not only quickly displaying the handwriting, but also taking into account the displaying effect of the handwriting.

An embodiment of the present disclosure provides a non-volatile computer-readable storage medium, in which at least one executable instruction is stored, the executable instruction causing a System on Chip and a display controller to perform the following operations:

transmitting report point data associated with received handwriting to a display controller by a System on Chip;

looking up a LUT table and acquiring a first waveform of driving an ink screen based on the report point data by the display controller; and driving the ink screen to display the handwriting using the first waveform by the display controller.

In an optional way, the looking up the LUT table and acquiring the first waveform of driving the ink screen based on the report point data by the display controller further includes:

receiving the report point data by the display controller;

establishing a layer cache by the display controller;

generating a first image of the handwriting in the layer cache based on the report point data by the display controller; and looking up the LUT table and acquiring the first waveform of driving the ink screen based on the first image of the handwriting by the display controller.

In an optional way, the transmitting the report point data associated with received handwriting to the display controller by the System on Chip further includes:

removing pressure-sensitive data from the report point data associated with the received handwriting by the System on Chip to remain only coordinate data in the report point data; and transmitting only the coordinate data in the report point data to the display controller by the System on Chip.

In an optional way, the executable instruction further causes the System on Chip and the display controller to perform the following operations:

transmitting the report point data associated with the received handwriting to an application layer of the System on Chip by a core layer of the System on Chip;

generating a second image of the handwriting based on the report point data by the application layer;

converting the second image into a grayscale image by the application layer;

transmitting the grayscale image to the core layer by the application layer;

transmitting the grayscale image to the display controller by the core layer;

looking up the LUT table and acquiring a second waveform of driving the ink screen based on the grayscale image by the display controller; and driving the ink screen to display the handwriting using the second waveform by the display controller.

In an optional way, the transmitting the report point data associated with the received handwriting to an application layer of the System on Chip by a core layer of the System on Chip is performed at the same time as or after the transmitting the report point data associated with received handwriting to the display controller by a System on Chip.

In an optional way, the transmitting the grayscale image to the display controller by the core layer further includes:

receiving, by the core layer, the grayscale image transmitted from the application layer;

transmitting the grayscale image to the display controller by the core layer after a tip of a handwriting stylus leaves the ink screen.

In an optional way, the tip of the handwriting stylus leaving the ink screen is determined by:

the tip of the handwriting stylus leaving the ink screen is determined if receiving the report point data is stopped.

In an optional way, the second image of the handwriting includes one or more of color, thickness and stroke of the handwriting.

Figure 8:
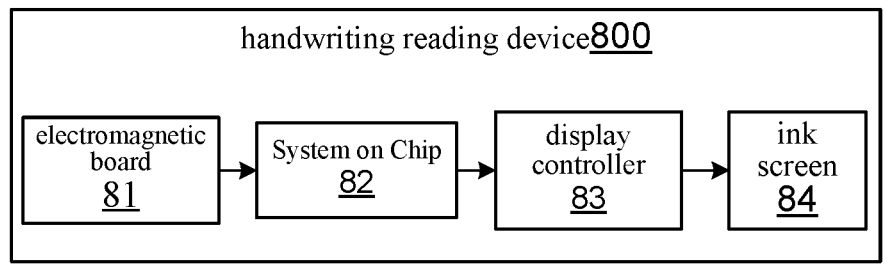
FIG. 8 shows a structural schematic diagram of a handwriting reading device provided by an embodiment of the present disclosure.

FIG. 8 shows a structural schematic diagram of a handwriting reading device provided by an embodiment of the present disclosure. As shown in FIG. 8, the handwriting reading device 800 includes an electromagnetic board 81, a System on Chip 82, a display controller 83 and ink screen 84, that are electrically connected in sequence.

The electromagnetic board 81 is configured to detect handwriting operation instructions generated by the electromagnetic stylus on the ink screen. Main control devices such as a central processing unit (CPU) are integrated in the System on Chip 82, which is the main chip of the reader. The display controller 83 is an Electronic Paper Display controller (EPDC) or a Timer Control Register (TCON). The TCON is also referred to as a logic board, a screen driver board, or a central control board. The System on Chip 82 outputs a grayscale image Look-Up-Table (LUT) to the display controller 83, and the display controller 83 is configured to obtain a waveform based on the grayscale image Look-Up-Table, and to drive the ink particles on the ink screen 84 to move based on the waveform, so as to realize imaging. The System on Chip 82 is provided with a communication interface, and the System on Chip 82 is electrically connected with the display controller 83 through the communication interface, and the System on Chip 82 is configured to send image data to be displayed to the display controller 83 through the communication interface. The display controller 83 is electrically connected with the ink screen 84, and the display controller 83 is configured to convert the image data into the waveform, and to drive the ink screen 84 to display the contents of the image data based on the waveform.

The System on Chip 82 and the display controller 83 are respectively configured to store at least one executable instruction 85, which causes the System on Chip 82 and the display controller 83 to perform the following operations:

transmitting report point data associated with received handwriting to a display controller by a System on Chip;

looking up a LUT table and acquiring a first waveform of driving an ink screen based on the report point data by the display controller; and driving the ink screen to display the handwriting using the first waveform by the display controller.

In an optional way, the looking up the LUT table and acquiring the first waveform of driving the ink screen based on the report point data by the display controller further includes:

receiving the report point data by the display controller;

establishing a layer cache by the display controller;

generating a first image of the handwriting in the layer cache based on the report point data by the display controller; and looking up the LUT table and acquiring the first waveform of driving the ink screen based on the first image of the handwriting by the display controller.

In an optional way, the transmitting the report point data associated with received handwriting to the display controller by the System on Chip further includes:

removing pressure-sensitive data from the report point data associated with the received handwriting by the System on Chip to remain only coordinate data in the report point data; and transmitting only the coordinate data in the report point data to the display controller by the System on Chip.

In an optional way, the executable instruction further causes the System on Chip and the display controller to perform the following operations:

transmitting the report point data associated with the received handwriting to an application layer of the System on Chip by a core layer of the System on Chip;

generating a second image of the handwriting based on the report point data by the application layer;

converting the second image into a grayscale image by the application layer;

transmitting the grayscale image to the core layer by the application layer;

transmitting the grayscale image to the display controller by the core layer;

looking up the LUT table and acquiring a second waveform of driving the ink screen based on the grayscale image by the display controller; and driving the ink screen to display the handwriting using the second waveform by the display controller.

In an optional way, the transmitting the report point data associated with the received handwriting to an application layer of the System on Chip by a core layer of the System on Chip is performed at the same time as or after the transmitting the report point data associated with received handwriting to the display controller by a System on Chip.

In an optional way, the transmitting the grayscale image to the display controller by the core layer further includes:

receiving, by the core layer, the grayscale image transmitted from the application layer;

transmitting the grayscale image to the display controller by the core layer after a tip of a handwriting stylus leaves the ink screen.

In an optional way, the tip of the handwriting stylus leaving the ink screen is determined by:

the tip of the handwriting stylus leaving the ink screen is determined if receiving the report point data is stopped.

In an optional way, the second image includes one or more of color, thickness and stroke of the handwriting.

Figure 9:
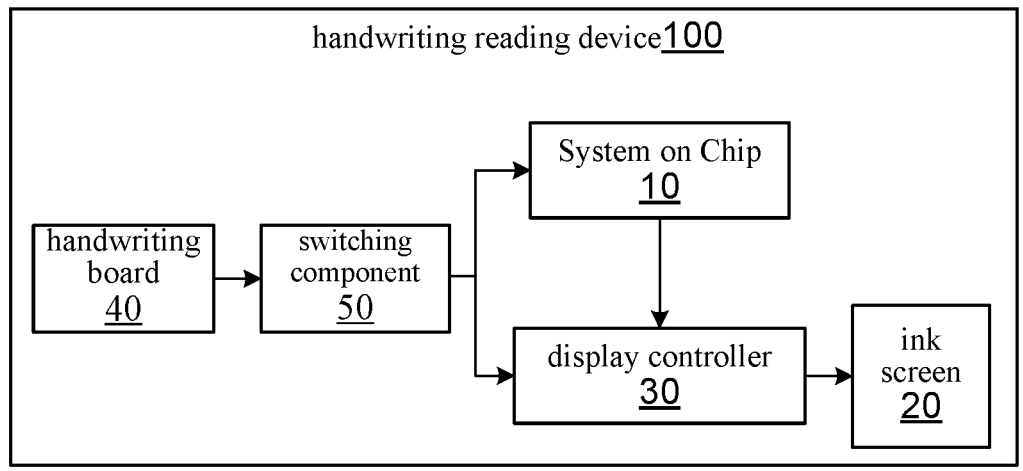
FIG. 9 shows a structural schematic diagram of a handwriting reading device provided by another embodiment of the present disclosure.

Another embodiment of the present disclosure provides a handwriting reading device. FIG. 9 shows a structural schematic diagram of the handwriting reading device provided by this embodiment. As shown in FIG. 9, a handwriting reading device 100 includes a System on Chip 10, an ink screen 20, a display controller 30, a handwriting board 40 and a switching component 50. Main control devices such as a central processing unit (CPU) and the like are integrated in the System on Chip 10, which is the main chip of the reader. The display controller 30 is an Electronic Paper Display controller or a Timer Control Register. The handwriting board 40 is configured to detect the report point data, and may be an electromagnetic board, a capacitor board or a resistance board. The System on Chip 10 is electrically connected with the display controller 30, the display controller 30 is electrically connected with the ink screen 20, and the switching component 50 is electrically connected with the handwriting board 40, the System on Chip 10, and the display controller 30, respectively, and is configured to switch between a connection of the handwriting board 40 and the System on Chip 10 and another connection of the handwriting board 40 and the di splay controller 30.

When the handwriting board 40 and the System on Chip 10 are connected, the report point data is transmitted to the System on Chip 10 through the switching component 50. When the handwriting board 40 and the display controller 30 are connected, the report point data is transmitted to the display controller 30 through the switching component 50. At this time, the report point data does not need to be processed layer by layer by the System on Chip 10, and the display controller 30 directly looks up the LUT table based on the report point data to acquire the waveform of driving the ink screen 20 and to drive the ink screen 20 to display.

In the present embodiment, by providing the switching component to switch between a connection of the handwriting board and the System on Chip and another connection of the handwriting board and the display controller, when the connection of the handwriting board and the display controller are switched on, direct transmission of report point data between the handwriting board and the display controller is realized, and the display controller receives the report point data detected by the handwriting board and drives the ink screen to display. Compared to the way of the report point data from the core layer of the System on Chip to its application layer and then back to the core layer from the application layer in the prior art, the present disclosure saves transmission time for the report point data, shortens time-consuming of drawing the handwriting, and improve speed of drawing the handwriting.

Figure 10:
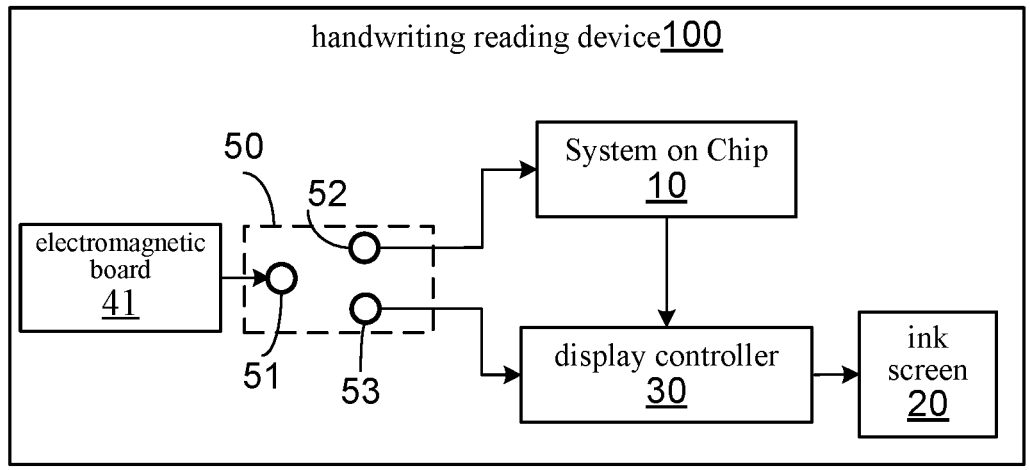
FIG. 10 shows a structural schematic diagram of a handwriting reading device provided by another embodiment of the present disclosure.

Yet another embodiment of the present disclosure provides a handwriting reading device. FIG. 10 shows a structural schematic diagram of the handwriting reading device provided by this embodiment. As shown in FIG. 10, a handwriting reading device 100 includes a System on Chip 10, an ink screen 20, a display controller 30, an electromagnetic board 41 and a switching component 50. Main control devices such as a central processing unit (CPU) and the like are integrated in the System on Chip 10, which is the main chip of the reader. The display controller 30 is an Electronic Paper Display controller or a Timer Control Register. The electromagnetic board 41 detects a handwriting operation instructions generated by the electromagnetic stylus on the ink screen, and after the electromagnetic signal triggered by the electromagnetic pen is detected, the electromagnetic signal is converted into report point data. The System on Chip 10 is electrically connected with the display controller 30, the display controller 30 is electrically connected with the ink screen 20, and the switching component 50 is electrically connected with the electromagnetic board 41, the System on Chip 10, and the display controller 30, respectively, and is configured to switch between a connection of the electromagnetic board 41 and the System on Chip 10 and another connection of the electromagnetic board 41 and the display controller 30.

The switching component 50 has a first end 51, a second end 52 and a third end 53; the first end 51 is electrically connected with the electromagnetic board 41 for receiving the report point data, the second end 52 is electrically connected with the System on Chip 10, and the third end 53 is electrically connected with the display controller 30. The first end 51 is configured to be connected to either the second end 52 or the third end 53. When the first end 51 is connected to the second end 52, the report point data is transmitted to the System on Chip 10 through the switching component 50, and when the first end 51 is connected to the third end 53, the report point data is transmitted to the display controller 30 through the switching component 50. At this time, the report point data does not need to be processed layer by layer by the System on Chip 10, and the display controller 30 directly looks up the LUT table based on the report point data to acquire the waveform of driving the ink screen 20 and to drive the ink screen 20 to display.

In the present embodiment, by providing three ends in the switching component, a first end of which receives the report point data of the electromagnetic board, a second end of which is connected with the System on Chip, and a third end of which is connected with the display controller, and by controlling connection and disconnection of the first end and the third end, when the first end and the third end are connected, direct transmission of the report point data between the electromagnetic board and the display controller is realized, and the display controller can receive the report point data detected by the electromagnetic board and drives the ink screen to display. Compared to the way of the report point data from the core layer of the System on Chip to its application layer and then back to the core layer from the application layer in the prior art, the present disclosure saves transmission time for the report point data, shortens time-consuming of drawing the handwriting, and improve speed of drawing the handwriting.

Figure 11:
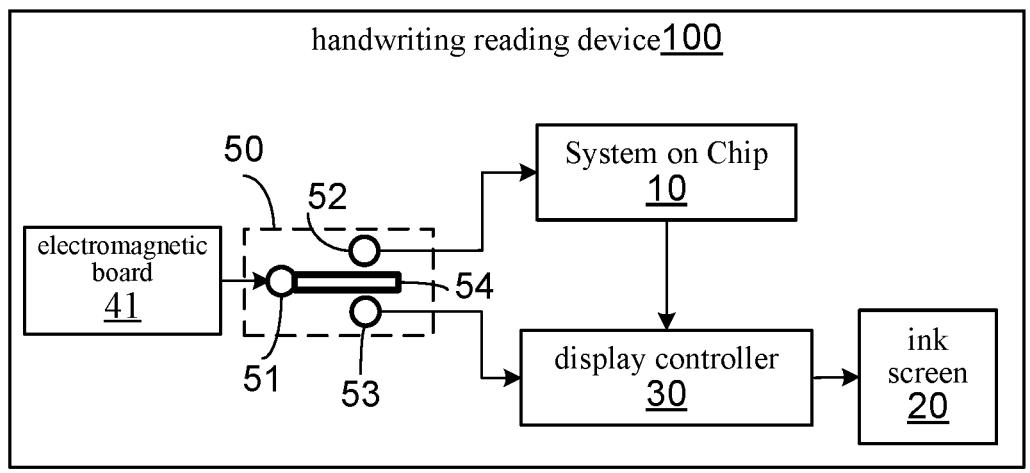
FIG. 11 shows a structural schematic diagram of a handwriting reading device provided by another embodiment of the present disclosure.

Yet another embodiment of the present disclosure provides a handwriting reading device. FIG. 11 shows a structural schematic diagram of the handwriting reading device provided by this embodiment. As shown in FIG. 11, a handwriting reading device 100 includes a System on Chip 10, an ink screen 20, a display controller 30, an electromagnetic board 41 and a switching component 50. Main control devices such as a central processing unit (CPU) and the like are integrated in the System on Chip 10, which is the main chip of the reader. The display controller 30 is an Electronic Paper Display controller or a Timer Control Register. The electromagnetic board 41 detects a handwriting operation instructions generated by the electromagnetic stylus on the ink screen, and after the electromagnetic signal triggered by the electromagnetic pen is detected, the electromagnetic signal is converted into the report point data. The System on Chip 10 is electrically connected with the display controller 30, the display controller 30 is electrically connected with the ink screen 20, and the switching component 50 is electrically connected with the electromagnetic board 41, the System on Chip 10, and the display controller 30, respectively, and is configured to switch between a connection of the electromagnetic board 41 and the System on Chip 10 and another connection of the electromagnetic board 41 and the display controller 30.

The switching component 50 has a first end 51, a second end 52, a third end 53 and a button 54. The first end 51 is electrically connected with the electromagnetic board 41 for receiving the report point data, the second end 52 is electrically connected with the System on Chip 10, and the third end 53 is electrically connected with the display controller 30. One end of the button 54 is fixedly connected with the first end 51 of the switching component 50, and the other end of the button 54 is switchable. When the other end of the button 54 is switched to be electrically connected with the second end 52 of the switching component 50, the first end 51 and the second end 52 of the switching component 50 are connected, and the report point data is transmitted to the System on Chip 10 through the switching component 50, and when the other end of the button 54 is switched to be electrically connected with the third end 53 of the switching component 50, the first end 51 and the third end 53 of the switching component 50 are connected, and the report point data is transmitted to the display controller through the switching component. At this time, the handwritten report data does not need to be processed layer by layer by the System on Chip 10, and the display controller 30 directly looks up the LUT table based on the report point data to acquire the waveform of driving the ink screen 20 and to drive the ink screen 20 to display.

Wherein the button 54 may be a toggle button or a push button.

In the present embodiment, by providing three ends in the switching component, a first end of which receives the report point data of the electromagnetic board, a second end of which is connected with the System on Chip, and a third end of which is connected with the display controller, and by controlling connection and disconnection of the first end and the third end by providing the button, when the first end and the third end are connected, direct transmission of the report point data between the electromagnetic board and the display controller is realized, and the display controller receives the report point data detected by the electromagnetic board and drives the ink screen to display. Compared to the way of the report point data from the core layer of the System on Chip to its application layer and then back to the core layer from the application layer in the prior art, the present disclosure saves transmission time for the report point data, shortens time-consuming of drawing the handwriting, and improve speed of drawing the handwriting.

Figure 12:
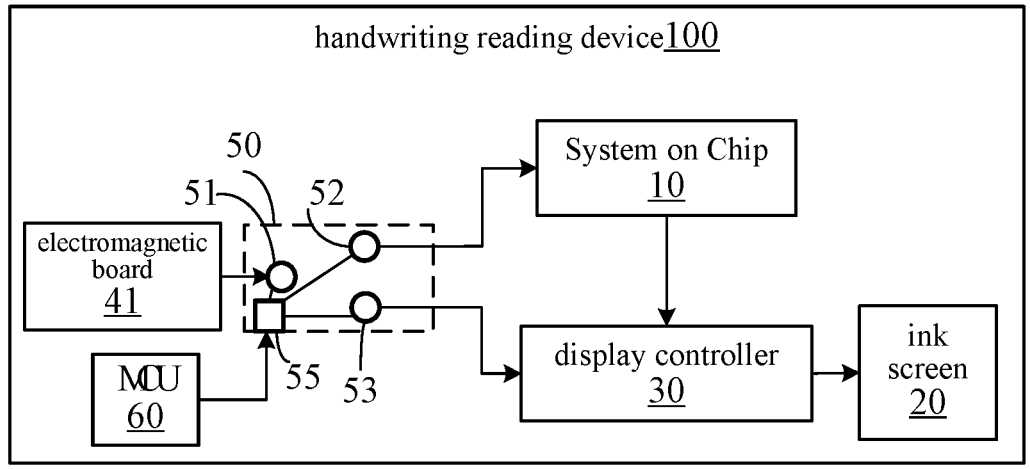
FIG. 12 shows a structural schematic diagram of a handwriting reading device provided by another embodiment of the present disclosure.

Yet another embodiment of the present disclosure provides a handwriting reading device. FIG. 12 shows a structural schematic diagram of the handwriting reading device provided by this embodiment. As shown in FIG. 12, a handwriting reading device 100 includes a System on Chip 10, an ink screen 20, a display controller 30, an electromagnetic board 41, a switching component 50 and a MCU 60. Main control devices such as a central processing unit (CPU) and the like are integrated in the System on Chip 10, which is the main chip of the reader. The display controller 30 is an Electronic Paper Display controller or a Timer Control Register. The electromagnetic board 41 detects a handwriting operation instructions generated by the electromagnetic stylus on the ink screen, and after the electromagnetic signal triggered by the electromagnetic pen is detected, the electromagnetic signal is converted into the report point data. The System on Chip 10 is electrically connected with the display controller 30, the display controller 30 is electrically connected with the ink screen 20, and the switching component 50 is electrically connected with the electromagnetic board 41, the System on Chip 10, and the display controller 30, respectively, and is configured to switch between a connection of the electromagnetic board 41 and the System on Chip 10 and another connection of the electromagnetic board 41 and the display controller 30.

The switching component 50 has a first end 51, a second end 52, a third end 53 and a control end 55; the first end 51 is electrically connected with the electromagnetic board 41 for receiving the report point data, the second end 52 is electrically connected with the System on Chip 10, and the third end 53 is electrically connected with the display controller 30.

The MCU 60 is electrically connected with the control end 55 of the switching component 50 to switch between a connection of the first end 51 and the second end 52 and another connection of the first end 51 and the third end 53 of the switching component 50. When the MCU 60 controls the first end 51 and the second end 52 of the switching component 50 are connected, the report point data is transmitted to the System on Chip 10 through the switching component 50; when the MCU 60 controls the first end 51 and the third end 53 of the switching component 50 are connected, the report point data is transmitted to the display controller 30 through the switching component 50. At this time, the handwritten report data does not need to be processed layer by layer by the System on Chip 10, and the display controller 30 directly looks up the LUT table based on the report point data to acquire the waveform of driving the ink screen 20 and to drive the ink screen 20 to display.

In the present embodiment, by providing three ends in the switching component, a first end of which receives the report point data of the electromagnetic board, a second end of which is connected with the System on Chip, and a third end of which is connected with the display controller, and by controlling connection and disconnection of the first end and the third end by providing a MCU, when the first end and the third end are connected, direct transmission of the report point data between the electromagnetic board and the display controller is realized, and the display controller receives the report point data detected by the electromagnetic board and drives the ink screen to display. Compared to the way of the report point data from the core layer of the System on Chip to the application layer and then back to the core layer from the application layer in the prior art, the present disclosure saves transmission time for the report point data, shortens time-consuming of drawing the handwriting, and improve speed of drawing the handwriting.

Figure 13:
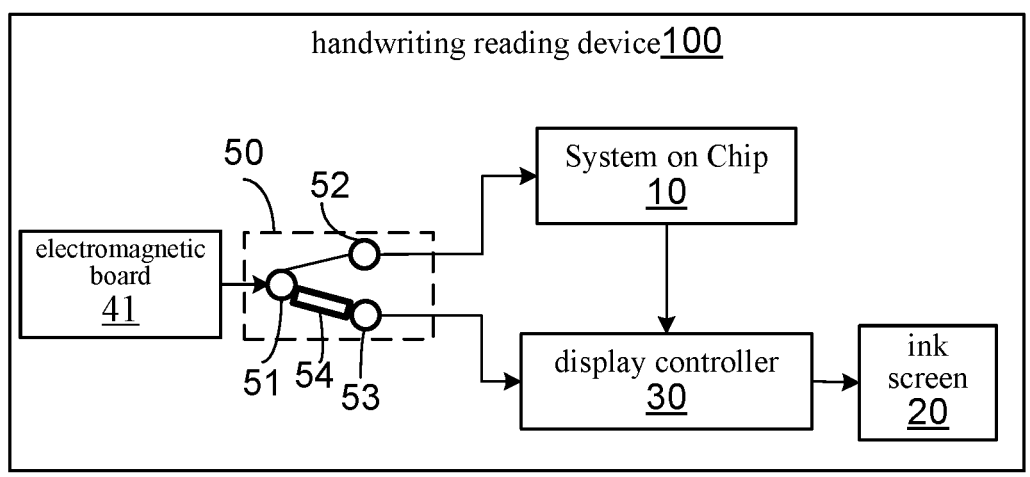
FIG. 13 shows a structural schematic diagram of a handwriting reading device provided by another embodiment of the present disclosure.

Yet another embodiment of the present disclosure provides a handwriting reading device. FIG. 13 shows a structural schematic diagram of the handwriting reading device provided by this embodiment. As shown in FIG. 13, a handwriting reading device 100 includes a System on Chip 10, an ink screen 20, a display controller 30, an electromagnetic board 41 and a switching component 50. Main control devices such as a central processing unit (CPU) and the like are integrated in the System on Chip 10, which is the main chip of the reader. The display controller 30 is an Electronic Paper Display controller or a Timer Control Register. The electromagnetic board 41 detects a handwriting operation instructions generated by the electromagnetic stylus on the ink screen, and after the electromagnetic signal triggered by the electromagnetic pen is detected, the electromagnetic signal is converted into report point data. The System on Chip 10 is electrically connected with the display controller 30, the display controller 30 is electrically connected with the ink screen 20, and the switching component 50 is electrically connected with the electromagnetic board 41, the System on Chip 10, and the display controller 30, respectively, and is configured to switch between a connection of the electromagnetic board 41 and the System on Chip 10 and another connection of the electromagnetic board 41 and the display controller 30.

The switching component 50 has a first end 51, a second end 52 and a third end 53. The first end 51 is electrically connected with the electromagnetic board 41 for receiving the report point data, the second end 52 is electrically connected with the System on Chip 10, and the third end 53 is electrically connected with the display controller 30. When the first end 51 are connected to the second end 52, the report point data is transmitted to the System on Chip 10 through the switching component 50. The first end 51 is electrically connected to the third end 53 through a switching unit 56, and when the first end 51 and the third end 53 are connected by the switching unit 56, the report point data is also transmitted to the display controller 30 through the switching component 50. At this time, the handwritten report data does not need to be processed layer by layer by the System on Chip 10, and the display controller 30 directly looks up the LUT table based on the report point data to acquire the waveform of driving the ink screen 20 and to drive the ink screen 20 to display; when the first end 51 and the third end 53 are disconnected by the switching unit 56, the report point data is not transmitted to the display controller 30 through the switching component 50.

Figure 14:
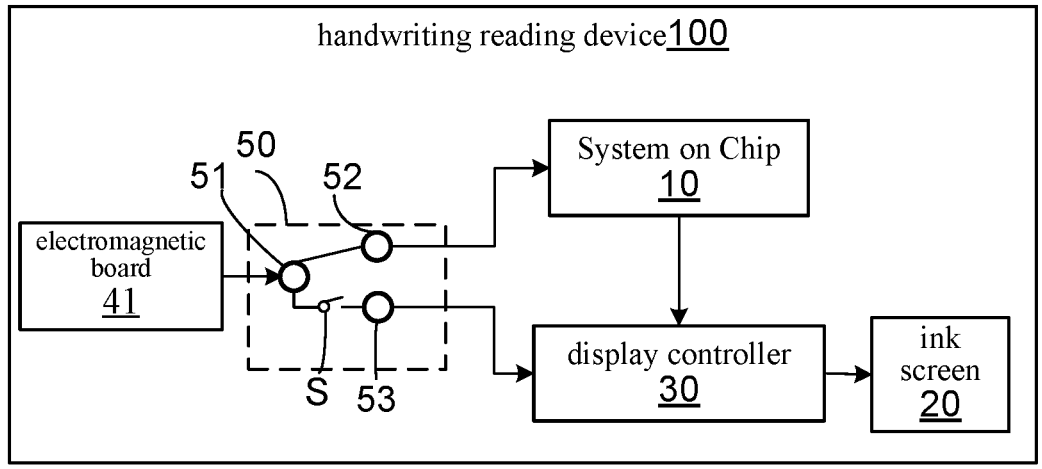
FIG. 14 shows a structural schematic diagram of a button switch used in FIG. 7.
Figure 15:
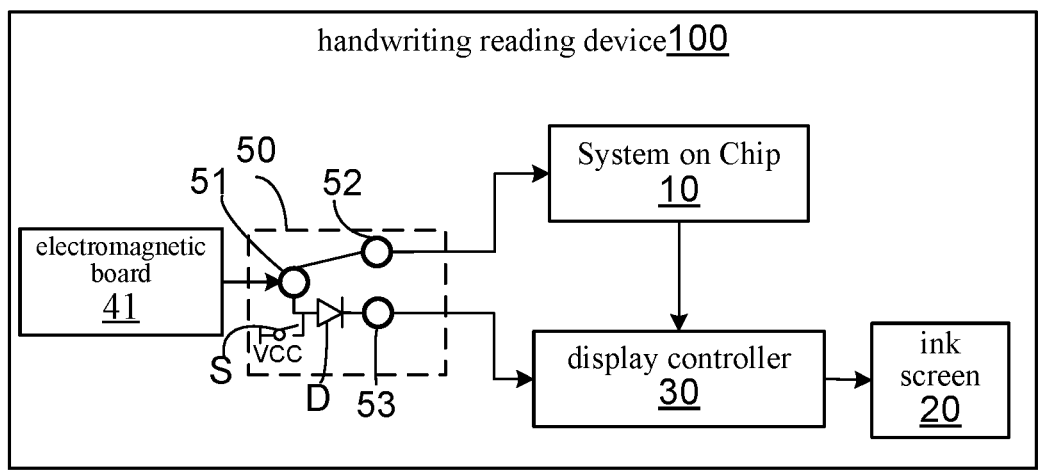
FIG. 15 shows a structural schematic diagram of a combination of a button switch and a switch diode used in FIG. 7.

The switching unit 56 is a button switch or a combination of a button switch and a switching diode. As shown in FIG. 14, in this embodiment, a button switch S is used as the switching unit. As shown in FIG. 15, in this embodiment, a combination of a button switch S and a switching diode D is used as the switching unit. One end of the switching diode D is electrically connected to the first end 51 of the switching component 50, and the one end of the switching diode D is also connected to the power source through the button switch S, and the other end of the switching diode D is electrically connected to the third end 53 of the switching component 50. When the button switch S is switched on, the switching diode D is turned on, and the first end 51 and the third end 53 of the switching component 50 are connected; when the button switch S is switched off, the switching diode D is turned off, and the first end 51 and the third end 53 of the switch module 50 are disconnected.

In the present embodiment, by providing three ends in the switching component, a first end of which receives the report point data of the electromagnetic board, a second end of which is connected with the System on Chip, and a third end of which is connected with the display controller, the first end and the second end being kept connected, and by controlling connection and disconnection of the first end and the third end by a switching unit, when the first end and the third end are connected, transmission of the report point data in two paths is realized. In one path the report point data is directly transmitted from the electromagnetic board to the display controller, and the ink screen is driven by the display controller to display, which saves transmission time of the report point data, shortens time-consuming of drawing the handwriting, and improves speed of drawing the handwriting, in the other path, the report point data is transmitted to the display controller after being processed the System on Chip, and at this time, the report point data is transmitted by the System on Chip from the core layer to application layer, and after image synthesis is performed by the application layer, then the grayscale image is transmitted to the display controller through the core layer, and displaying of the ink screen is driven by the display controller. After processing of the report point data previously transmitted directly by the electromagnetic board is completed by the display controller, then the grayscale image synthesized by the application layer will be processed, and the displaying effect observed by the user is: a black line with effect of no thickness and no stroke is displayed in the screen first, and then the screen performs refreshing once to refresh the original black line into a line with various effects, so as to achieve not only quickly displaying the handwriting, but also taking into account the displaying effect of the handwriting.

Figure 16:
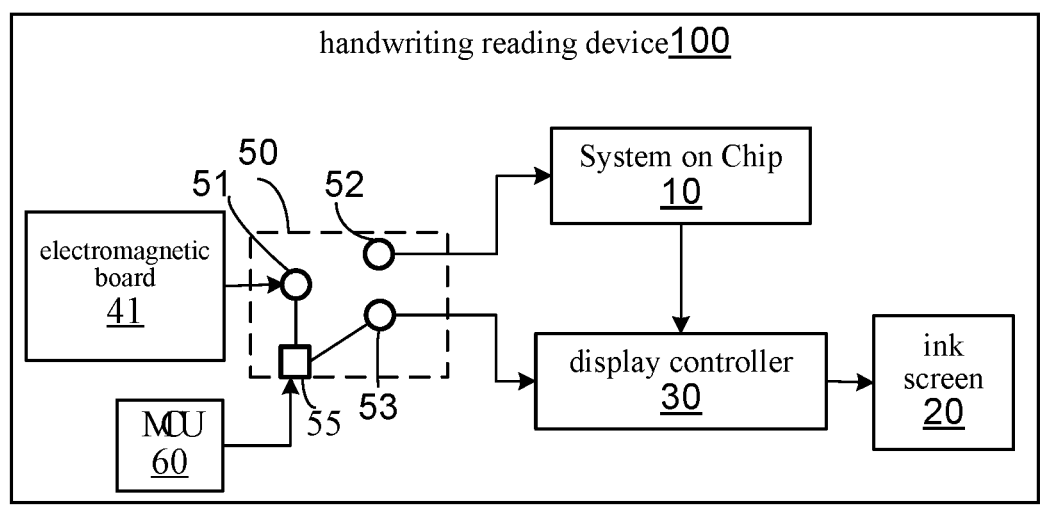
FIG. 16 shows a structural schematic diagram of a handwriting reading device provided by another embodiment of the present disclosure.

Yet another embodiment of the present disclosure provides a handwriting reading device. FIG. 16 shows a structural schematic diagram of the handwriting reading device provided by this embodiment. As shown in FIG. 16, a handwriting reading device 100 includes a System on Chip 10, an ink screen 20, a display controller 30, an electromagnetic board 41, a switching component 50 and a MCU 60. Main control devices such as a central processing unit (CPU) and the like are integrated in the System on Chip 10, which is the main chip of the reader. The display controller 30 is an Electronic Paper Display controller or a Timer Control Register. The electromagnetic board 41 detects a handwriting operation instructions generated by the electromagnetic stylus on the ink screen, and after the electromagnetic signal triggered by the electromagnetic pen is detected, the electromagnetic signal is converted into report point data. The System on Chip 10 is electrically connected with the display controller 30, the display controller 30 is electrically connected with the ink screen 20, and the switching component 50 is electrically connected with the electromagnetic board 41, the System on Chip 10, and the display controller 30, respectively, and is configured to switch between a connection of the electromagnetic board 41 and the System on Chip 10 and another connection of the electromagnetic board 41 and the display controller 30.

The switching component 50 has a first end 51, a second end 52, a third end 53 and a control end 55, the first end 51 is electrically connected with the electromagnetic board 41 for receiving the report point data, the second end 52 is electrically connected with the System on Chip 10, and the third end 53 is electrically connected with the display controller 30; the first end 51 and the second end 52 are continuously connected, and the report point data is transmitted to the System on Chip 10 through the switching component 50.

The MCU 60 is electrically connected with the control end 55 of the switching component 50 to control connection and disconnection between the first end 51 and the third end 53 of the switching component 50. When the first end 51 and the third end 53 of the switching component 50 are connected by the MCU 60, the report point data is also transmitted to the display controller 30 through the switching component 50. At this time, the handwritten report data does not need to be processed layer by layer by the System on Chip 10, and the display controller 30 directly looks up the LUT table based on the report point data to acquire the waveform of driving the ink screen 20 and to drive the ink screen 20 to display. When the first end 51 and the third end 53 of the switching component 50 are disconnected by the MCU 60, the report point data is not transmitted to the display controller 30 through the switching component 50. At this time, the report point data is transmitted to the display controller 30 only after being processed by the System on Chip 10.

In the present embodiment, by providing three ends in the switching component, a first end of which receives the report point data of the electromagnetic board, a second end of which is connected with the System on Chip, and a third end of which is connected with the display controller, the first end and the second end being kept connected, and by controlling connection and disconnection between the first end and the third end by a MCU, when the first end and the third end are connected, transmission of the report point data in two paths is realized. In one path the report point data is directly transmitted from the electromagnetic board to the display controller, and the ink screen is driven by the display controller to display, which saves transmission time of the report point data, shortens time-consuming of drawing the handwriting, and improves speed of drawing the handwriting. In the other path the report point data of is transmitted to the display controller after being processed the System on Chip. At this time, the report point data is transmitted by the System on Chip from the core layer to the application layer, and after image synthesis is performed by the application layer, the grayscale image is transmitted to the display controller through the core layer, and displaying of the ink screen is driven by the display controller. After processing of the report point data previously transmitted directly by the electromagnetic board is completed by the display controller, the grayscale image synthesized by the application layer will be processed, and the displaying effect observed by the user is: a black line with effect of no thickness and no stroke is displayed in the screen first, and then the screen performs refreshing once to refresh the original black line into a line with various effects, so as to not only quickly display the handwriting, but also take into account the displaying effect of the handwriting.

In the above embodiments, the first end 51, the second end 52 and the third end 53 of the switching component 50 may all use data interfaces, such as a Digital Peripheral Interface (DPI), a Serial Peripheral Interface (SPI) or an I2C (Inter-Integrated Circuit) interface and the like.

The algorithms and displays provided herein are not inherently related to any particular computer, virtual system, or other device. Various general-purpose systems can also be used with teaching based on this. The structure required to construct such a system is apparent from the above description. The present disclosure is not directed to any particular programming language. It should be understood that various programming languages may be used to implement the disclosures described herein, and that the descriptions of specific languages above are intended to disclose optimal embodiments of the disclosure.

In the description provided herein, numerous specific details are set forth. It will be understood, however, that embodiments of the present disclosure may be practiced without these specific details. In some instances, well-known methods, structures and techniques have not been shown in detail in order not to obscure an understanding of this description.

Similarly, it is to be understood that in the above description of exemplary embodiments of the present disclosure, various features of the present disclosure are sometimes grouped together into a single implementation in order to simplify the present disclosure and to aid in the understanding of one or more of the various disclosed aspects, examples, figures, or descriptions thereof. However, this method of disclosure should not be interpreted as reflecting an intention that the claimed disclosure requires more features than are expressly recited in each claim. Rather, as the following claims reflect, disclosed aspects lie in less than all features of a single foregoing disclosed embodiment. Thus, the claims following the Detailed Description are hereby expressly incorporated into this Detailed Description, with each claim standing on its own as a separate embodiment of the present disclosure.

Those skilled in the art will understand that the modules in the device in the embodiment can be adaptively changed and arranged in one or more devices different from the embodiment. The modules or units or components in the embodiments may be combined into one module or unit or component, and further they may be divided into multiple sub-modules or sub-units or sub-assemblies. All features disclosed in this specification (including accompanying claims, abstract and drawings) and any method or apparatus so disclosed may be employed in any combination, unless at least some of such features or procedures or elements are mutually exclusive. All processes or units are combined. Each feature disclosed in this specification (including the accompanying claims, abstract and drawings) may be replaced by alternative features serving the same, equivalent or similar purpose, unless expressly stated otherwise.

Furthermore, it is to be understood by those skilled in the art that although some of the embodiments herein include certain features, but not others, included in other embodiments, that combinations of features of the different embodiments are intended to be within the scope of the present disclosure And form different embodiments. For example, in the following claims, any of the claimed embodiments may be used in any combination.

It should be noted that the above-described embodiments illustrate rather than limit the disclosure, and that alternative embodiments may be devised by those skilled in the art without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present disclosure may be implemented by means of hardware comprising several different elements and by means of a suitably programmed computer. In a unit claim enumerating several means, several of these means may be embodied by one and the same item of hardware. The use of the words first, second, and third, etc. do not denote any order. These words can be interpreted as names.

What is claimed is:

1. A method for processing report point data, comprising:
    transmitting report point data associated with received handwriting to a display controller directly from a hardware layer of a System on Chip;
    looking up a LUT table (Look-Up-Table) and acquiring a first waveform of driving an ink screen based on the report point data by the display controller, wherein the looking up the LUT table and acquiring the first waveform of driving the ink screen based on the report point data by the display controller further comprises:
        receiving the report point data by the display controller, establishing a layer cache by the display controller,
        generating the first image of the handwriting in the layer cache based on the report point data by the display controller, and
        looking up the LUT table and acquiring the first waveform of driving the ink screen based on the first image of the handwriting by the display controller;
    driving the ink screen to display a first image of the handwriting using the first waveform by the display screen controller; and
    wherein the method further comprises:
    transmitting the report point data associated with the received handwriting to an application layer of the System on Chip by a core layer of the System on Chip;
    generating a second image of the handwriting based on the report point data by the application layer;
    converting the second image into a grayscale image by the application layer;
    transmitting the grayscale image to the core layer by the application layer;
    transmitting the grayscale image to the display controller by the core layer;
    looking up the LUT table and acquiring a second waveform of driving the ink screen based on the grayscale image by the display controller; and
    driving the ink screen to display the second image of the handwriting using the second waveform by the display controller.

2. The method according to claim 1, wherein the transmitting the report point data associated with received handwriting to the display controller by the System on Chip further comprises:
    removing pressure-sensitive data from the report point data associated with the received handwriting by the System on Chip to remain only coordinate data in the report point data; and
    transmitting only the coordinate data in the report point data to the display controller by the System on Chip.

3. The method according to claim 1, wherein the transmitting the report point data associated with the received handwriting to an application layer of the System on Chip by a core layer of the System on Chip is performed at the same time as or after the transmitting the report point data associated with received handwriting to the display controller by a System on Chip.

4. The method according to claim 1, wherein the transmitting the grayscale image to the display controller by the core layer further comprises:
    receiving, by the core layer, the grayscale image transmitted from the application layer; and
    transmitting the grayscale image to the display controller by the core layer in response to determining that a tip of a handwriting stylus leaves the ink screen.

5. The method according to claim 4, wherein the tip of the handwriting stylus leaves the ink screen is determined when receiving the report point data is stopped.

6. The method according to claim 1, wherein the second image of the handwriting comprises one or more of color, thickness and stroke of the handwriting.

7. A handwriting reading device, comprising an electromagnetic board, a System on Chip, a display controller and an ink screen that are electrically connected in sequence, wherein the electromagnetic board is configured to detect a handwritten operation instruction generated by an electromagnetic stylus on the ink screen, the System on Chip and the display controller are configured to respectively store at least one executable instruction that upon execution causes the System on Chip and the display controller to perform operations, the operations comprising:
    transmitting report point data associated with received handwriting to a display controller directly from a hardware layer of a System on Chip;
    looking up a LUT table (Look-Up-Table) and acquiring a first waveform of driving an ink screen based on the report point data by the display controller, wherein the looking up the LUT table and acquiring the first waveform of driving the ink screen based on the report point data by the display controller further comprises:
        receiving the report point data by the display controller, establishing a layer cache by the display controller,
        generating the first image of the handwriting in the layer cache based on the report point data by the display controller, and
        looking up the LUT table and acquiring the first waveform of driving the ink screen based on the first image of the handwriting by the display controller;
    driving the ink screen to display a first image of the handwriting using the first waveform by the display screen controller; and
    wherein the operations further comprise:
    transmitting the report point data associated with the received handwriting to an application layer of the System on Chip by a core layer of the System on Chip;
    generating a second image of the handwriting based on the report point data by the application layer;
    converting the second image into a grayscale image by the application layer;
    transmitting the grayscale image to the core layer by the application layer;
    transmitting the grayscale image to the display controller by the core layer;
    looking up the LUT table and acquiring a second waveform of driving the ink screen based on the grayscale image by the display controller; and
    driving the ink screen to display the second image of the handwriting using the second waveform by the display controller.

8. The handwriting reading device according to claim 7, wherein the transmitting the report point data associated with received handwriting to the display controller by the System on Chip further comprises:

removing pressure-sensitive data from the report point data associated with the received handwriting by the System on Chip to remain only coordinate data in the report point data; and transmitting only the coordinate data in the report point data to the display controller by the System on Chip.

9. The handwriting reading device according to claim 7, wherein the transmitting the report point data associated with the received handwriting to an application layer of the System on Chip by a core layer of the System on Chip is performed at the same time as or after the transmitting the report point data associated with received handwriting to the display controller by a System on Chip.

10. The handwriting reading device according to claim 7, wherein the transmitting the grayscale image to the display controller by the core layer further comprises:

receiving, by the core layer, the grayscale image transmitted from the application layer;

transmitting the grayscale image to the display controller by the core layer in response to determining that a tip of a handwriting stylus leaves the ink screen.

11. The handwriting reading device according to claim 10, wherein the tip of the handwriting stylus leaves the ink screen is determined when receiving the report point data is stopped.

12. The handwriting reading device according to claim 7, wherein the second image of the handwriting comprises one or more of color, thickness and stroke of the handwriting.

13. A non-transitory computer readable storage medium storing executable instructions, wherein the executable instructions upon execution by a processor cause the processor to perform operations of:

transmitting report point data associated with received handwriting to a display controller directly from a hardware layer of a System on Chip;

looking up a LUT table (Look-Up-Table) and acquiring a first waveform of driving an ink screen based on the report point data by the display controller, wherein the looking up the LUT table and acquiring the first waveform of driving the ink screen based on the report point data by the display controller further comprises:

receiving the report point data by the display controller, establishing a layer cache by the display controller, generating the first image of the handwriting in the layer cache based on the report point data by the display controller, and looking up the LUT table and acquiring the first waveform of driving the ink screen based on the first image of the handwriting by the display controller;

driving the ink screen to display a first image of the handwriting using the first waveform by the display screen controller; and wherein the operations further comprise:

transmitting the report point data associated with the received handwriting to an application layer of the System on Chip by a core layer of the System on Chip;

generating a second image of the handwriting based on the report point data by the application layer;

converting the second image into a grayscale image by the application layer;

transmitting the grayscale image to the core layer by the application layer;

transmitting the grayscale image to the display controller by the core layer;

looking up the LUT table and acquiring a second waveform of driving the ink screen based on the grayscale image by the display controller; and driving the ink screen to display the second image of the handwriting using the second waveform by the display controller.

* * * * *